United States Patent [19]
Koganezawa et al.

[11] Patent Number: 5,489,409
[45] Date of Patent: Feb. 6, 1996

[54] METHOD OF MAKING A WINDOW FRAME AND A WINDOW PANEL WITH A WINDOW FRAME

[75] Inventors: Kouji Koganezawa; Noriyuki Yoshihara; Masaki Tsujino, all of Yokohama, Japan

[73] Assignee: Asahi Glass Company, Ltd., Tokyo, Japan

[21] Appl. No.: 264,947

[22] Filed: Jun. 24, 1994

[30] Foreign Application Priority Data

Jun. 25, 1993 [JP] Japan .................................. 5-180695
Jul. 2, 1993 [JP] Japan .................................. 5-190753

[51] Int. Cl.$^6$ .................................................. B29C 47/02
[52] U.S. Cl. .................. 264/167; 156/108; 264/177.16; 264/252; 425/381; 425/465; 425/466
[58] Field of Search ..................... 264/167, 171, 264/177.1, 177.16–177.20, 210.2, 250, 252; 425/381, 466, 465; 156/107–109

[56] References Cited

U.S. PATENT DOCUMENTS

| | | | |
|---|---|---|---|
| 4,187,068 | 2/1980 | Vassar | 425/465 |
| 4,439,125 | 3/1984 | Dieckmann et al. | 425/466 |
| 4,960,375 | 10/1990 | Saito et al. | 425/465 |
| 5,057,265 | 10/1991 | Kunert et al. | 264/250 |
| 5,162,090 | 11/1992 | Arima | 264/167 |
| 5,167,893 | 12/1992 | Yada et al. | |
| 5,174,623 | 12/1992 | Yada et al. | |
| 5,229,054 | 7/1993 | Yada et al. | 425/466 |
| 5,273,704 | 12/1993 | Scholl et al. | 425/466 |
| 5,281,291 | 1/1994 | Yada et al. | 425/466 |
| 5,332,541 | 7/1994 | Tamura | 264/177.2 |
| 5,362,428 | 11/1994 | Tsujino et al. | 425/466 |

FOREIGN PATENT DOCUMENTS

| | | |
|---|---|---|
| 0407682 | 1/1991 | European Pat. Off. . |
| 0479677 | 4/1992 | European Pat. Off. . |
| 0541824 | 5/1993 | European Pat. Off. . |
| 62-121030 | 3/1987 | Japan . |
| 62-121030 | 6/1987 | Japan .................. 264/177.16 |
| 3-128721 | 5/1991 | Japan . |
| 5-08280 | 1/1993 | Japan .................. 264/177.1 |
| 5-177690 | 7/1993 | Japan .................. 425/466 |
| 6-71725 | 3/1994 | Japan .................. 264/177.1 |

*Primary Examiner*—Jeffery R. Thurlow
*Attorney, Agent, or Firm*—Sughrue, Mion, Zinn, Macpeak & Seas

[57] ABSTRACT

A method of making by extrusion-molding an elongated window frame used for a window panel of a vehicle is to use an extrusion molding die which includes a slide core defining the cross-sectional shape of the window frame, and to move the slide core in the extrusion-molding die so that the cross-sectional shape of the window frame is continuously changed along the direction of the length.

26 Claims, 13 Drawing Sheets

METHOD OF MAKING A WINDOW FRAME AND A WINDOW PANEL WITH A WINDOW FRAME

BACKGROUND OF THE INVENTION

1. Field of the Invention

The present invention relates to a method of making a window frame used suitably for a window panel for vehicles or buildings, and a method of making a window panel with a window frame.

2. Description of Related Art

There is a case that a window frame for a front glass of a vehicle is provided with a rain gutter at its side portion to provide a flow passage for rain. The rain gutter is to prevent the eyesight of a driver from decreasing by the deposition of rain drops scattering from the sides of the front glass onto the side windows. However, it is unnecessary to form the rain gutter in the upper side portion of the window frame.

In a conventional technique, window frames having different shapes in cross section were separately prepared for the upper peripheral portion and side peripheral portions of the front glass, and the window frames were joined interposing a joint in one piece at a portion corresponding to a corner of the front glass by using a compression or an injection molding method. Therefore, the position of the joined portions was conspicuous. Further, the color tone and the gloss of the window frame were non-uniform because the parts of the window frame were separately prepared. In addition, the joined portions may be broken, or noises may be produced due to the vibrations of the vehicle during driving.

In order to eliminate the above-mentioned problems, a method of making a window frame of a one-piece body without a joined portion was proposed in U.S. Pat. No. 5,167,893 and U.S. Pat. No. 5,174,623. According to the proposal, a shutter is provided in front of an extrusion-molding die to open and close slowly an opening portion of the die so that a rain gutter is gradually formed in and disappears from the window frame. However, in such method, the cross-sectional shape of the window frame is changed by closing a part of the opening of the die. At the opening of the die, a resistance takes place in resin in a portion in contact with the shutter, and no resistance takes place in the resin at a portion which does not contact to the shutter. Then there is a difference of speed in the resin to be extruded depending on the presence or the absence of the resistance, whereby a shaped product is bent to the side of the shutter, and a stable shaping is difficult to obtain. Further, when a high viscous material is used, shaping of the window frame is difficult because the shape of the window frame is changed at the outlet of the die.

SUMMARY OF THE INVENTION

It is an object of the present invention to eliminate problems of the appearance and the strength of a window frame, due to the fact that the window frame was made by joining separate parts of the window frame, which is to be attached to the peripheral portion of a window panel for a front glass or a rear glass of a vehicle.

It is another object of the present invention to provide an extrusion-shaping method of a window frame having an excellent appearance and stability in shaping by improving the disadvantage of a conventional method using an obstacle such as a shutter provided in front of an extrusion-molding die to change the cross-sectional shape of the window frame.

It is another object of the present invention to provide a window panel wherein a window frame is formed integrally with a panel without a joined portion.

In accordance with the present invention, there is provided a method of making by extrusion-molding an elongated window frame used for a window panel, characterized by using an extrusion-molding die which includes at least one slide core defining the cross-sectional shape of the window frame, and extruding resin from the die during moving the slide core in the extrusion-molding die so that the cross-sectional shape of the window frame is continuously changed.

A feature of the present invention is to provide a movable type slide core disposed inside a molding die. The slide core constitutes a wall of the flow passage in association the main body of the molding die through which resin to be molded passed, and the shape in cross section of the flow passage at the downstream side defines the shape in cross section of a window frame to be shaped. The inner cavity of the molding die which provides the cross-sectional shape of the window frame is continuously changed by moving the slide core from the outside so that the cross-sectional shape of the window frame can be continuously changed. Accordingly, even when a window frame whose cross-sectional shape is continuously changed is prepared, the shape of the outlet opening surface of the molding die is flat. Namely, the window frame can be extruded straight without any influence of an obstacle such as a shutter, whereby the shaping operation of the window frame can be stable and a fault of the appearance is difficult to occur. Further, since the portion for determining the shape of the window frame is inside the molding die, and a sufficiently long flow passage is maintained for shaping the window frame, it is easy to treat material difficult to shape or material having a high viscosity, which was difficult to shape by using a shutter or the like.

Further, since the shaping portion of the molding die is of a structure which is hardly influenced by outer air, the appearance of the window frame can be kept constant.

According to the present invention, there is provided a method of making a window panel with a window frame wherein a shaped product of resin is formed by extruding through a die resin on at least a surface of a window panel along the peripheral portion of the window panel, and the shaped product is cured to thereby connect the window panel with the cured shaped product in one piece, the method being characterized in that a thermoplastic resin is used as the resin; the thermoplastic resin is extruded in a softened state by heating it from the die so that the shaped product is formed on the peripheral portion of the window panel; and the thermoplastic resin is cured.

Further, according to the present invention, there is provided a method of making a window panel with a window frame wherein a shaped product of resin is formed by extruding through a die resin on at least a surface of a window panel along the peripheral portion of the window panel, wherein the extrusion-molding die is provided with at least one slide core inside it, and the slide core is moved during the extrusion of the resin, whereby the cross-sectional shape of the shaped product formed on the peripheral portion of the window panel is continuously changed.

BRIEF DESCRIPTION OF THE DRAWINGS

A more complete appreciation of the invention will be attained by referring to the following detailed description with reference to the accompanying drawings, wherein.

DESCRIPTION OF THE PREFERRED EMBODIMENTS

Preferred embodiments of the present invention will be described with reference to the drawings.

Figure 1:
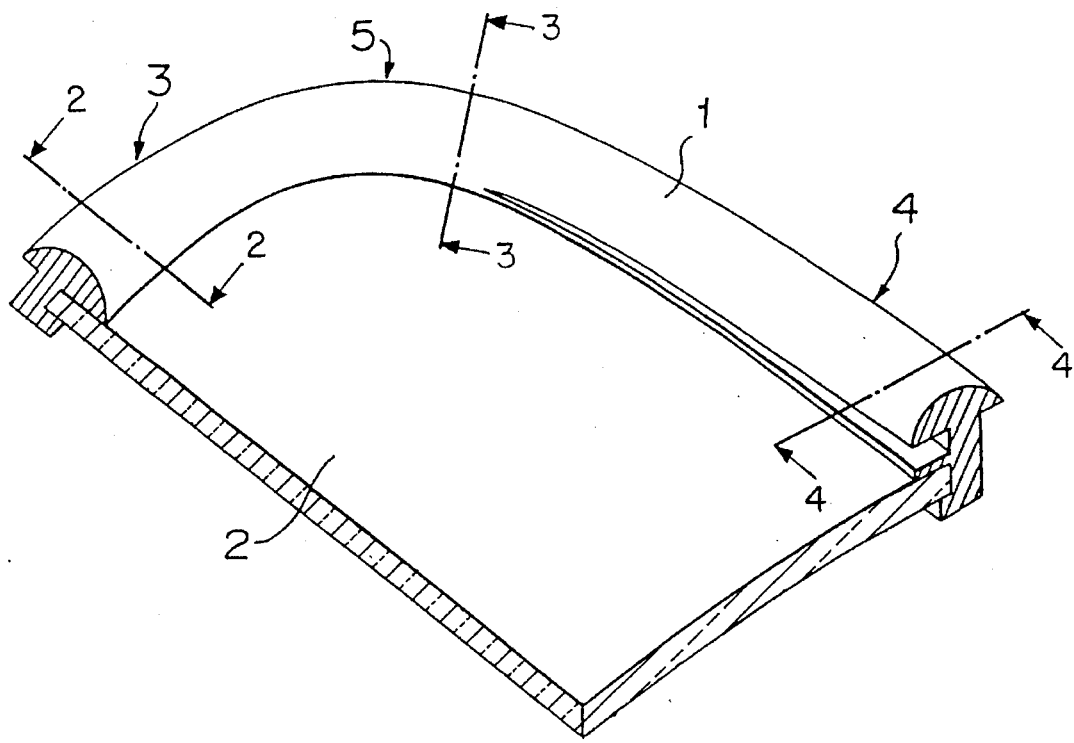
FIG. 1 is a perspective view partly omitted of a window panel made by the present invention wherein a corner portion of the window panel is shown.
Figure 2:
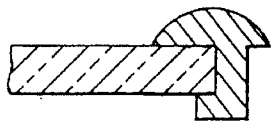
FIG. 2 is a cross-sectional view taken along a line X—X in FIG. 1.
Figure 3:
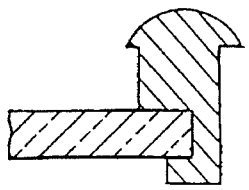
FIG. 3 is a cross-sectional view taken along a line Y—Y in FIG. 1.
Figure 4:
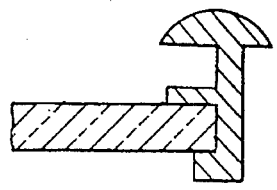
FIG. 4 is a cross-sectional view taken along a line Z—Z in FIG. 1.

FIG. 1 is a perspective view showing a corner portion of the front glass 2 attached with a window frame 1 for a vehicle, and FIGS. 2, 3 and 4 are respectively cross-sectional views taken along lines X—X, Y—Y and Z—Z of the window frame 1 shown in FIG. 1.

A rain gutter is not formed in an upper peripheral portion 3 of the window frame 1, which corresponds to the upper side of a window panel. The surface in cross section of the window frame 1 shown in FIG. 2 is in a flush surface form which reduces aerodynamic drag. On the other hand, a rain gutter is formed in a side peripheral portion 4 as shown in FIG. 4. The window frame 1 is a one-piece body at a corner portion.

An embodiment of a molding die used for the present invention is described with reference to a perspective view of FIGS. 5a and 5b.

Figure 5A:
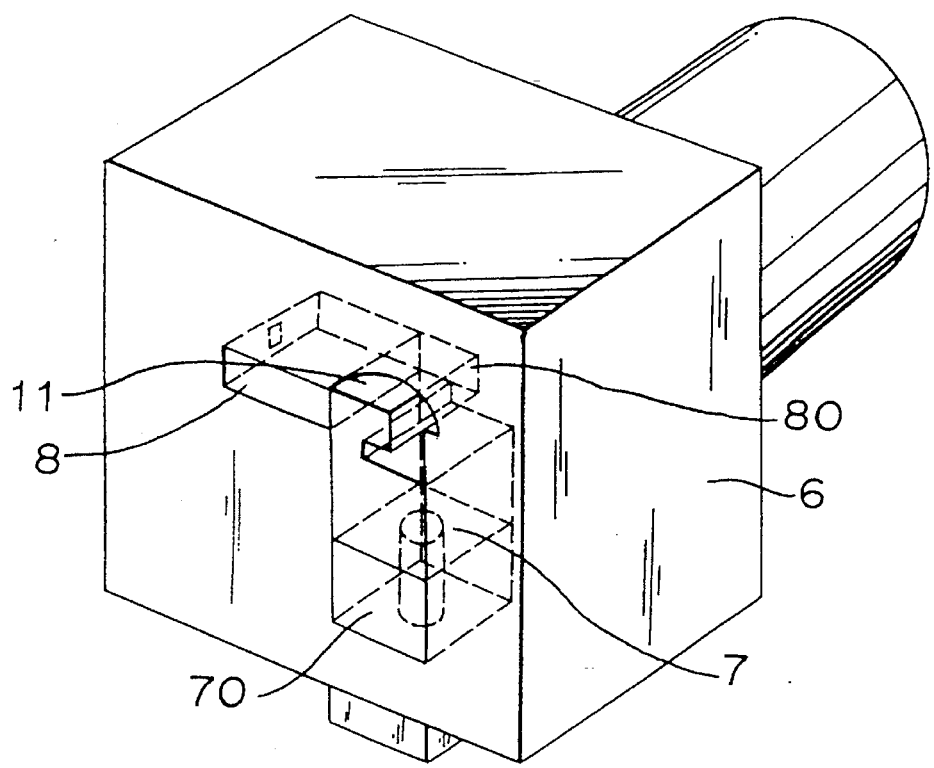
FIG. 5 is a perspective view showing an embodiment of a molding die used for the method of the present invention.
Figure 5B:
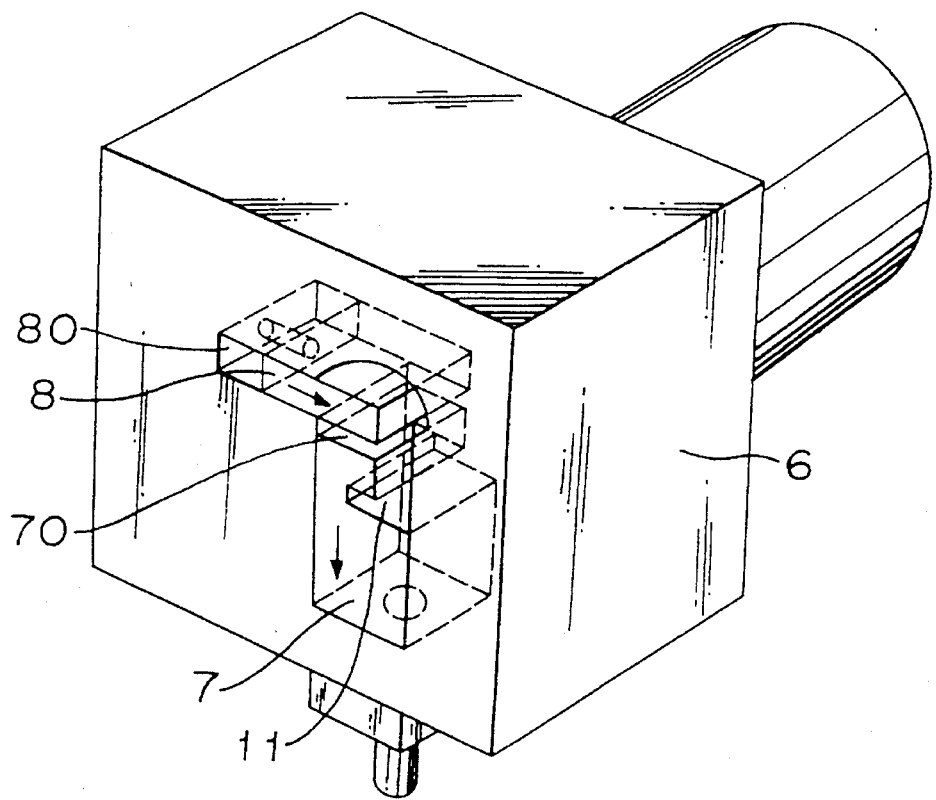

FIG. 5a shows the position of a slide core 7 received in a main body 6, which is for forming an upper peripheral portion of a window frame, and FIG. 5b shows the position of a slide core 8 received in the main body 6, which is for forming a side peripheral portion of the window frame. When the upper peripheral portion of the window frame is formed, the slide core 7 is located at an upper position in a movable space 70 inside the main body 6. On the other hand, the slide core 8 is located at the left side of a movable space 80 inside the main body 6. When the side peripheral portion of the window frame is formed, the slide core 7 is located at a lower position in the movable space 70 inside the main body 6. On the other hand, the slide core 8 is located at the right side of the movable space 80 inside the main body 6.

Resin extruded from an extruder is shaped in a shaping space 11 defined by the movable space 70 in the main body 6 and the slide cores 7 and 8. Thus, a shaped product of window frame is extruded with a gradual change of shape in cross section through the outlet opening of the die by advancing and retracting the slide cores 7, 8.

Preferred embodiments of the molding die used for the present invention will be described.

Figure 6:
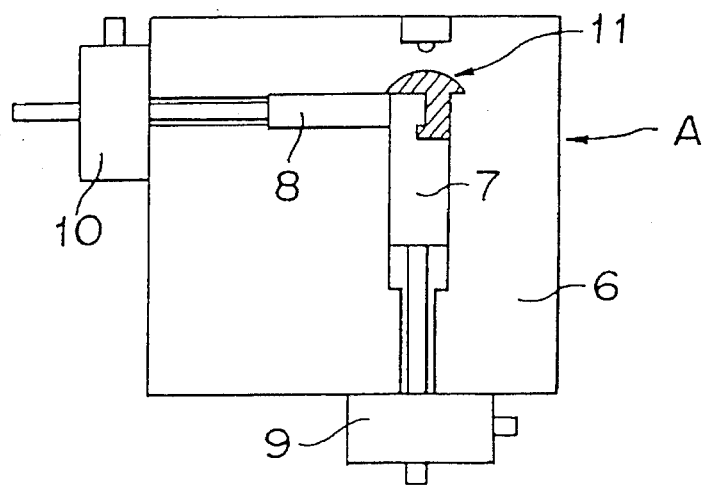
FIG. 6 is a plane view of a molding die A showing a window frame formed to have the cross-sectional shape shown in FIG. 2.
Figure 7:
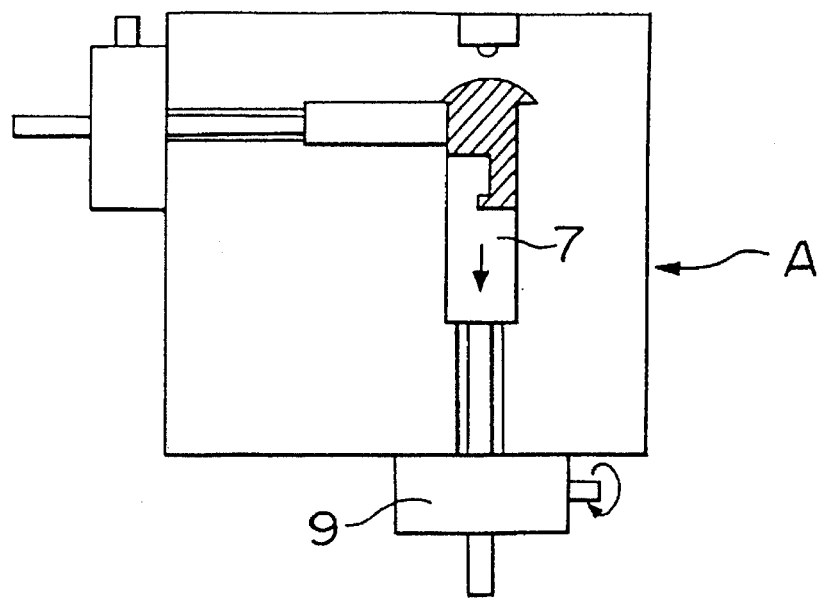
FIG. 7 is a plane view of the molding die A showing the window frame formed to have the cross-sectional shape as showing in FIG. 3.
Figure 8:
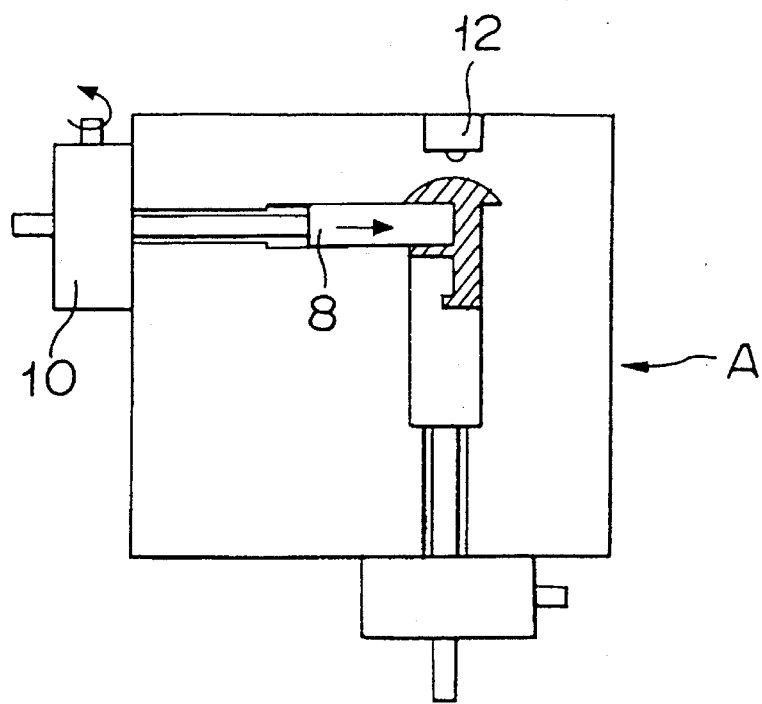
FIG. 8 is a plane view of the molding die A showing the window frame formed to have the cross-sectional shape shown in FIG. 4.

FIGS. 6 through 8 are plane views showing an embodiment of a molding die A. The window frame 1 shown in FIG. 1 through 4 is formed using of the molding die A which is attached to the top end of an extruder. The molding die A comprises a main body 6 and direct acting type slide cores 7 and 8 received inside the main body 6. The slide cores 7 and 8 are respectively moved in the vertical direction and lateral direction by means of electric motors 9 and 10 which are attached to the outer portions of the main body 6. Molten resin is passed through an inner cavity 11 of the main body 6 in the direction perpendicular to the paper surface of the drawings. Accordingly, the shape of the cavity in the plane view defines the shape in cross section of the window frame 1 to be prepared. The slide cores 7 and 8 are respectively formed to have a thickness of 30 mm so as to provide a sufficient shaping performance and durability.

The molding die A was attached to the top end of an extruder to extrude a thermoplastic polyvinyl chloride resin of an extrusion grade (manufactured by Shinetsu Polymer K.K.). During the extrusion of a window frame, the slide core 7 received inside the molding die A was gradually lowered by the driving force of the electric motor 9 so as to change the shape in cross section of the window frame at a portion corresponding from the upper peripheral portion 3 to the side portion 4 of the window panel 2. As a result, the cross-sectional shape of the window frame was continuously changed as shown by a hatched line portion in FIG. 7. Then, the slide core 8 was forwarded by the driving force of the electric motor 10 so that the cross-sectional shape of the window frame was continuously changed as shown by a hatched line portion in FIG. 8. Thus, the window frame with a rain gutter for window panel for a vehicle was obtained.

As the cross-sectional shape of the window frame is gradually changed as shown in FIGS. 2, 3 and 4, the cross-sectional area of the molding is changed such as 0.7 cm$^2$, 1.6 cm$^2$ and 1.2 cm$^2$. In order to improve the outer appearance of the shaped window frame 1 and to obtain a shape correctly corresponding to the shape of the outlet port of the molding die, a discharging rate of the resin is increased or decreased in proportion to the cross-sectional area of the window frame. The cross-sectional area of the window frame is directly determined by the movement of the slide cores. Accordingly, the discharging rate is controlled by a controlling means to control the movement of the slide cores in association with a revolution speed of the screw of the extruder. Further, the revolution speed of the screw can be controlled by detecting the movement of the resin relating to the wall surface of the shaping space by means of a light sensor 12 attached to the top end of the main body 6, if necessary.

Figure 9:
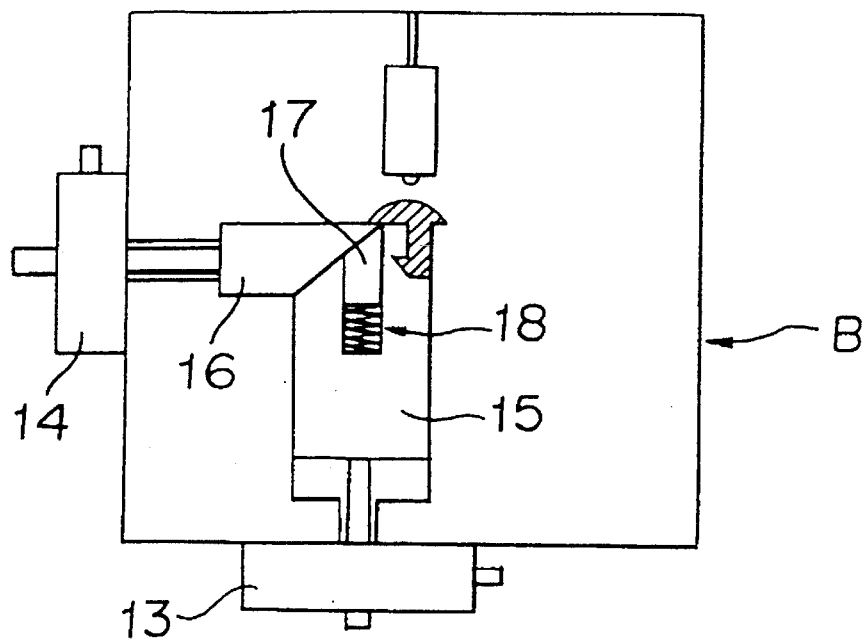
FIG. 9 is a plane view of a molding die of B in a state before an slide core 15 is moved.
Figure 10:
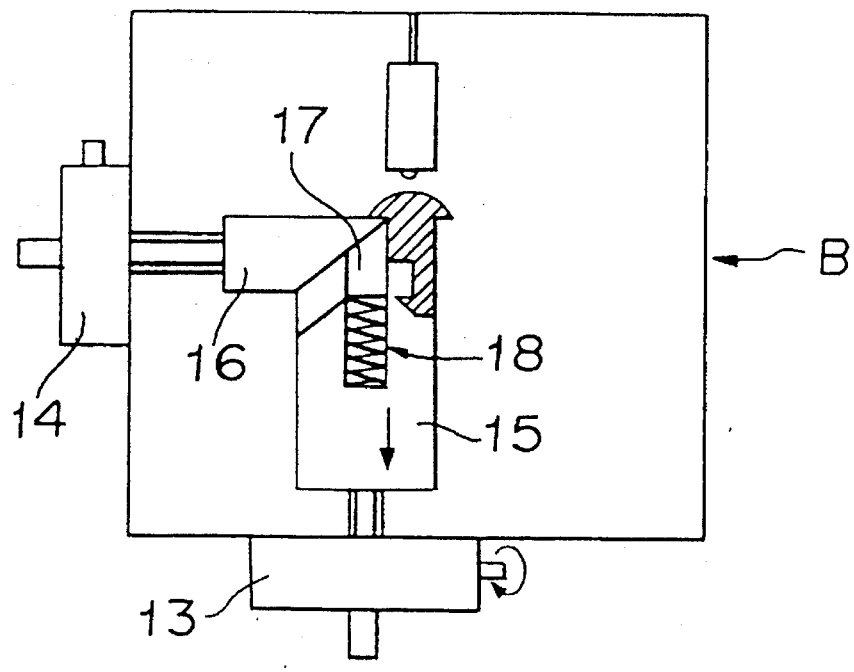
FIG. 10 is a plane view of the molding die B showing a state that the slide core 15 is lowered.
Figure 11:
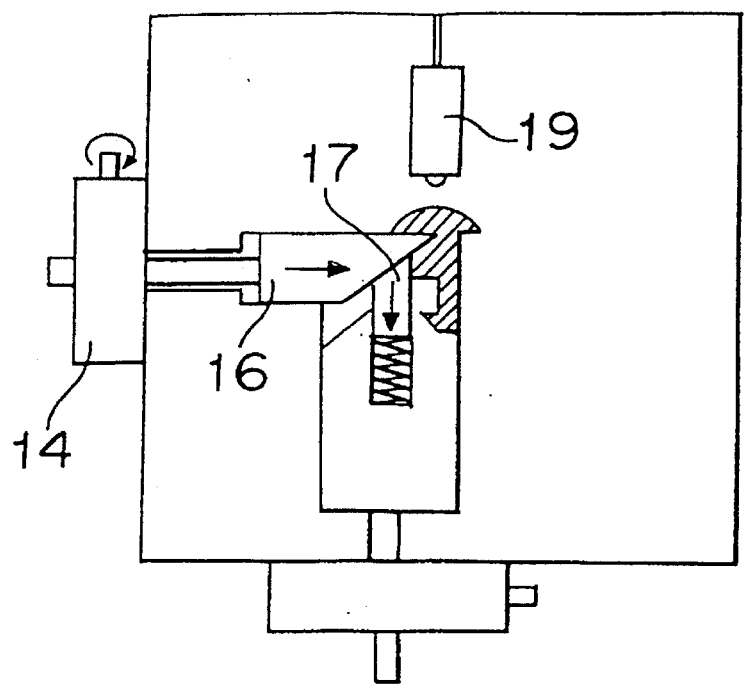
FIG. 11 is a plane view of the molding die B showing a state that an slide core 16 is moved forwardly.

FIGS. 9 through 11 are plane views of an embodiment of a molding die B which is used for making a window frame with a rain gutter in which the cross-sectional shape of the window frame is continuously changed, in a manner different from a case of using the molding die A. Direct acting type slide cores 15 and 16 are received inside the molding die B, which are movable by means of electric motors 13 and 14. Further, a slide core 17 is received in the slide core 15 by interposing a spring 18.

The molding die was attached to the top end of the extruder. Then, the slide core 15 was gradually lowered to continuously change the cross-sectional shape of a window frame to be produced as shown by the hatched line portion in FIG. 10. During the lowering of the slide core 15, the slide core 17 was pressed to the slide core 16 by means of the spring 18 to seal a space for shaping the window frame. Then, the slide core 16 was gradually forwarded, and at the same time, the slide core 17 was lowered by the pressing force of the slide core 16 so that the cross-sectional shape of the window frame was continuously changed as shown by a hatched line portion in FIG. 11. Thus, the window frame with a rain gutter for a window panel for a vehicle was obtained.

The discharging rate of the resin can be controlled so as to correspond to a change of the cross-sectional shape of the window frame in the same manner as the embodiment as shown in FIGS. 6 through 8. Thus, the window frame having a predetermined shape in cross section was obtained. Further, the discharging rate of the resin can be controlled by using a light sensor 33 if necessary, in the same manner as the embodiment as shown in FIGS. 6 through 8. As the resin, a polyolefin series resin of an extrusion grade (Mitsui Petrochemical Industries Ltd.) was used.

Figure 12:
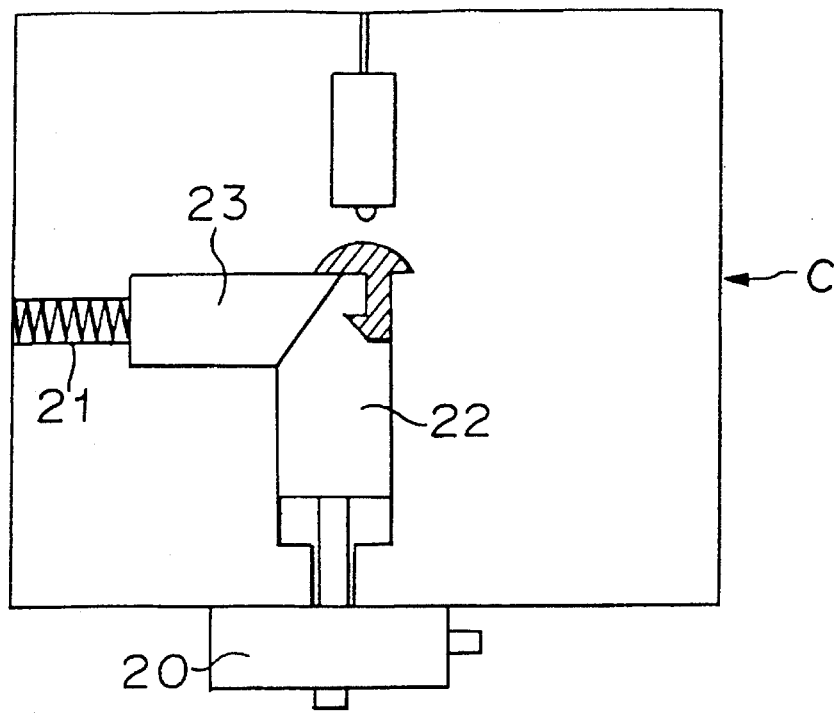
FIG. 12 is a plane view of a molding die C in a state before an slide core is moved.
Figure 13:
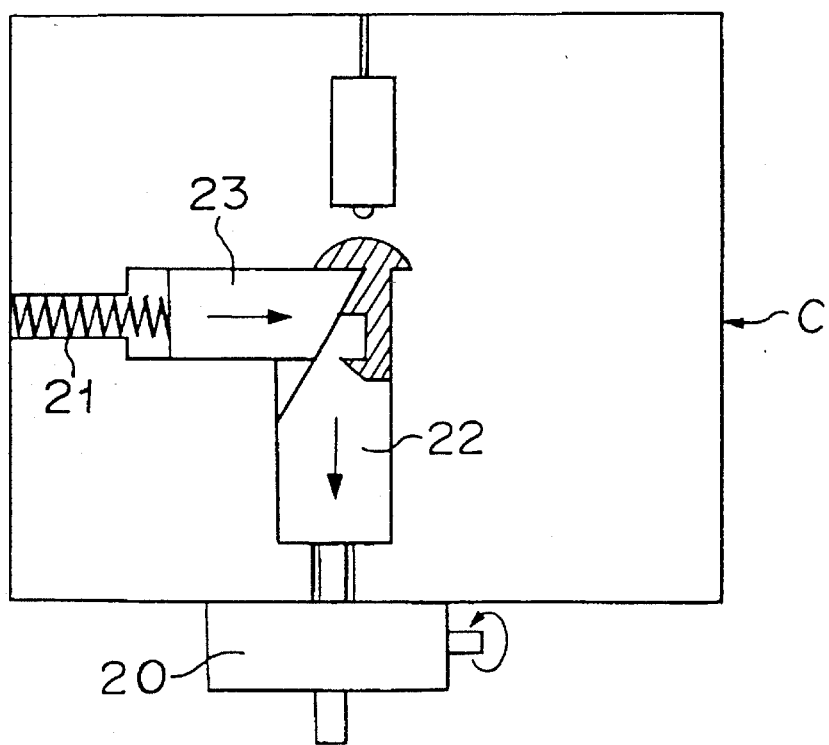
FIG. 13 is a plane view of the molding die C in a state after the slide core has been moved.

FIGS. 12 and 13 are plane views of a molding die C which has a construction different from the molding dies A and B for forming a window frame with a rain gutter in which the cross-sectional shape of the window frame is continuously changed. The molding die C receives therein a direct acting type slide core 22 which is movable vertically by means of a electric motor 20. Further, an slide core 23 is received in the molding die C so as to be pressed to the slide core 22 by means of a spring 21.

The molding die C was attached to the top end of the extruder. The slide core 22 was gradually lowered. Then, the slide core 23 was forwarded by the spring action of the spring 21 keeping a press-contact with the slide core 22 so that the cross-sectional shape of the window frame was continuously changed as shown by a hatched line portion in FIG. 13. Thus, the molded product with a rain gutter for the window panel for a vehicle was obtained.

Figure 14:
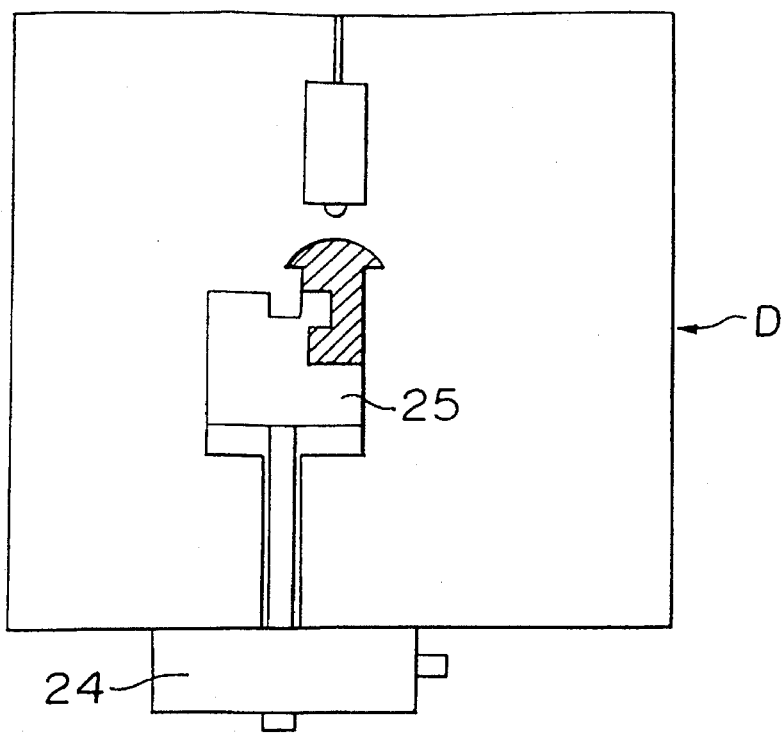
FIG. 14 is a plane view of a molding die D in a state before an slide core is moved.
Figure 15:
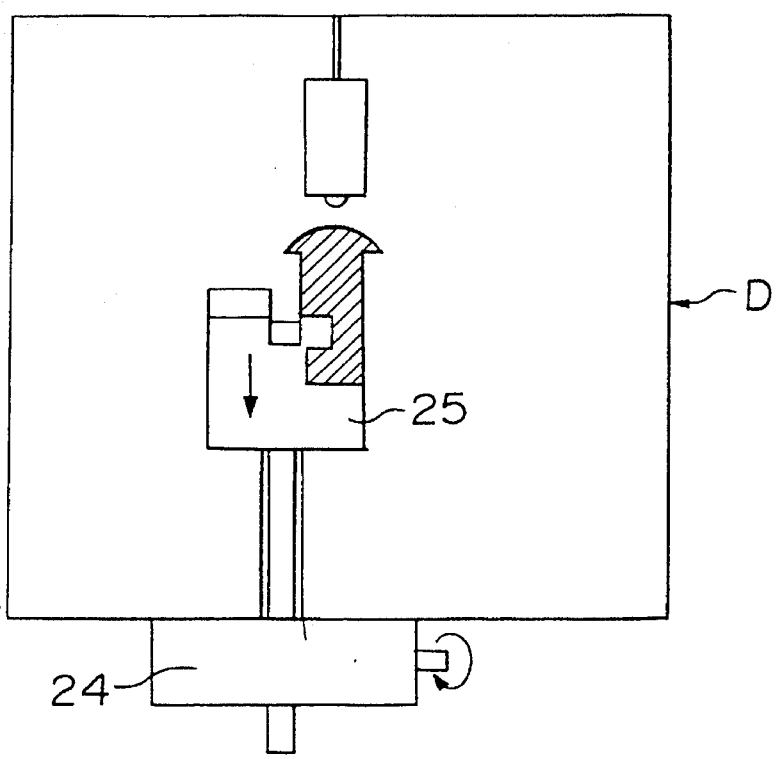
FIG. 15 is a plane view of the molding die D in a state after the slide core has been moved.

FIGS. 14 and 15 are plane views of a molding die D which is used for making a window frame in which the height of the portion having an ornamental surface is continuously changed. A direct acting type slide core 25 is received in the molding die D so as to be vertically movable by means of an electric motor 24.

The molding die D was attached to the top end of the extruder. The slide core 25 was gradually lowered to continuously change the cross-sectional shape of the window frame as shown by the hatched line portion in FIG. 15. Thus, a molded product for the window panel of a vehicle was obtained.

Figure 16:
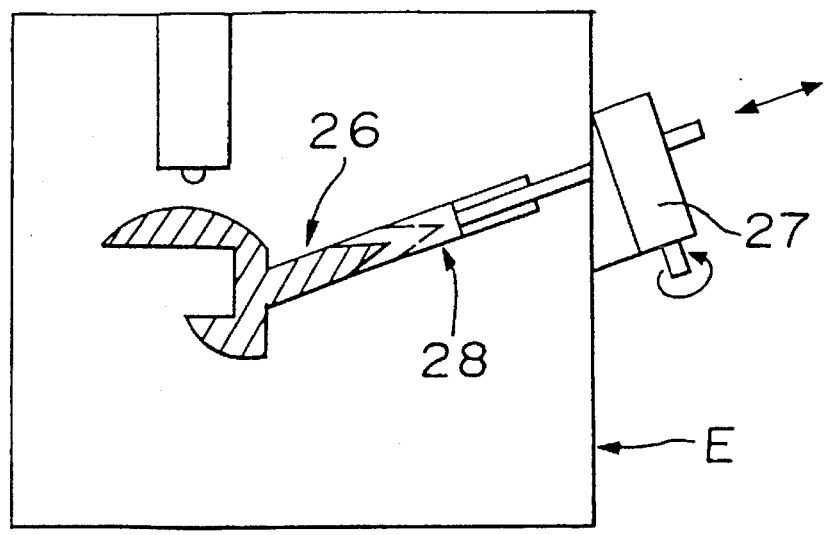
FIG. 16 is a plane view of a molding die E.

FIG. 16 is a plane view of a molding die E which is used for making a window frame in which the length of a lip 26 projecting from a side surface of the window frame is continuously changed. A direct acting type insertion die 28 is received in the molding die E so as to be movable in the front and back directions by means of an electric motor 27.

The molding die was attached to the top end of the extruder. A slide core 28 was moved forwardly and backwardly to obtain a molded product for a window panel for a vehicle wherein the length of the lip was continuously changed.

Figure 17:
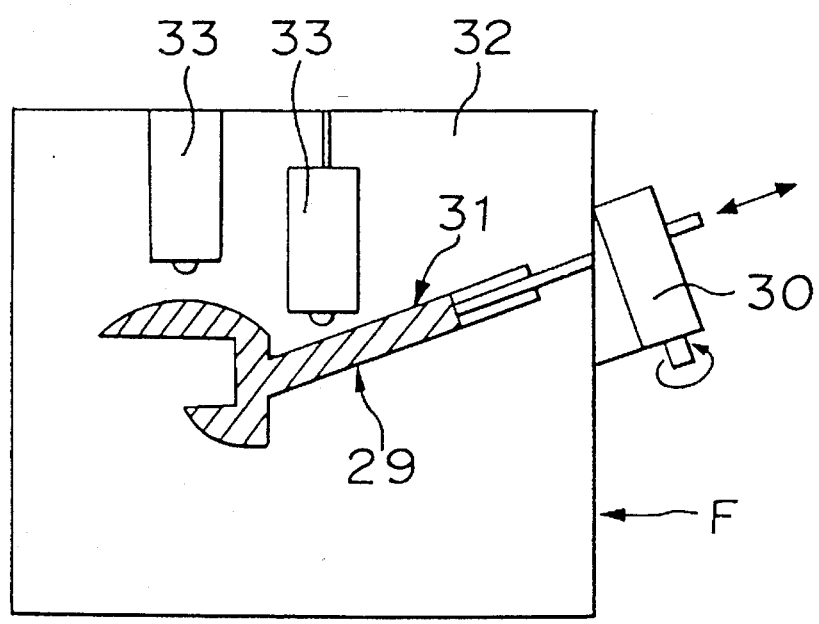
FIG. 17 is a plane view of a molding die F.

FIG. 17 is a plane view of a molding die F as another embodiment of making a window frame in which the length of a lip 29 projecting from a side surface of the window frame is continuously changed. A direct acting type slide core 31 is received in the molding die F so as to be movable forwardly and backwardly by means of an electric motor 30.

The molding die F was attached to the top end of two extruders by interposing a cross head. A first polyvinyl chloride resin having an extrusion grade rich in flexibility (manufactured by Shinetsu Polymer K.K.) was supplied to a portion of the lip 29 through the cross head while for the other portion, a second polyvinyl chloride resin of an extrusion grade rich in rigidity (manufactured by Shinetsu Polymer K.K.) was supplied through the cross head. During the supply of the two kinds of resin, the slide core 31 was moved forwardly and backwardly in the molding die F to thereby obtain a molded product for a window panel for a vehicle wherein the length of the lip is continuously changed.

Light sensors 33 were attached to the top end of the a main body 32 of the molding die F to detect the discharging rate of the two kinds of resin, and the revolution speed of the screw of the extruders was controlled so as to adjust the discharging rate of the two kinds of resin to be a constant rate. Thus, the appearance of the shaped window frame was improved.

When the window frame is formed by using the above-mentioned extrusion shaping method, the attachment of the window frame to a vehicle body is conducted by a post-attaching method. For the post-attaching method, there are several ways: the window frame is fitted and bonded to the peripheral portion of window panel or a window panel is fitted to an opening for window in a vehicle body, and then, the window frame is press-fitted to a space between the window panel and the opening for window. However, these methods may require much labor and it may be difficult to use automated processes.

In the post-attaching method, a moisture hardening type urethane series sealant or a dual liquid reaction hardening type urethane series sealant which has a high bonding strength to glass and excellent durability is generally used. Since the sealant is a highly viscous sol-like liquid, it is difficult to form a uniform coating layer. Accordingly, when the window frame is forcibly fitted to the window panel, an excessive amount of adhesive agent is squeezed out from an edge of the bonding surface, and the squeezed-out adhesive agent must be removed. Further, the time needed to cure the adhesive agent is as long such as several hours or a full day. Accordingly, it is desirable that the formation of the window frame at the peripheral portion of a window panel in one piece is conducted at the same time of extruding resin in a predetermined shape through molding die along the peripheral portion of the window panel. A preferred example of the method will be described.

Figure 18:
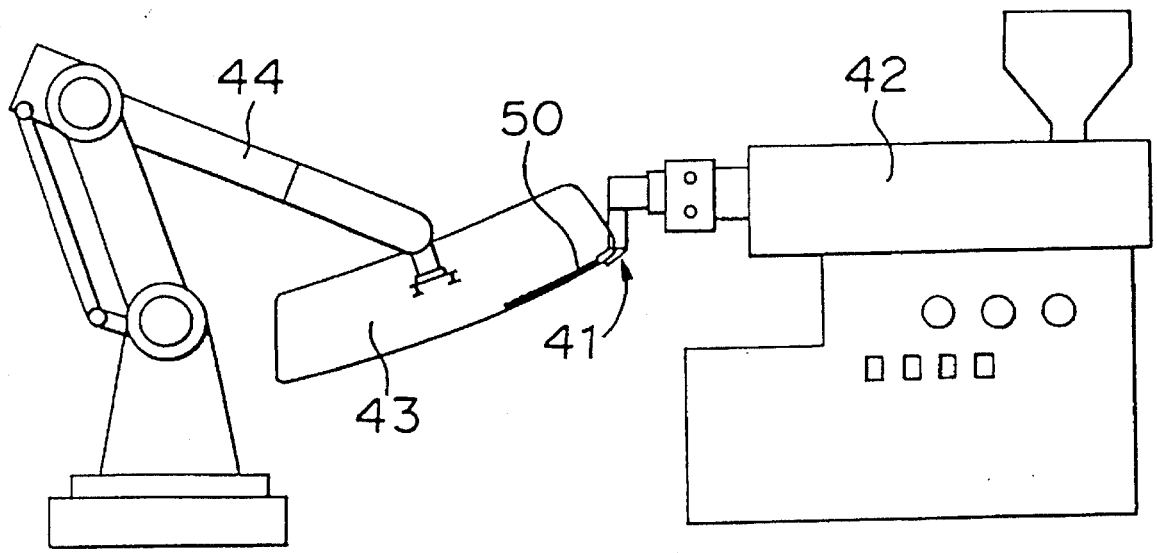
FIG. 18 is a schematic view showing an embodiment of the way of forming a window frame on a window panel in one piece according to the present invention.
Figure 19:
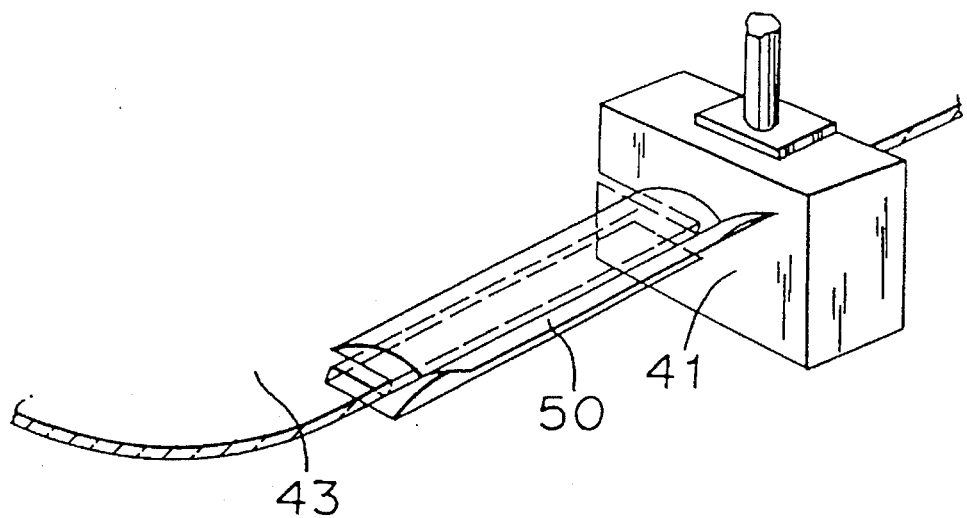
FIG. 19 in an enlarged perspective view of a molding die show in FIG. 18.

FIG. 18 is a schematic view showing an example of the method of forming integrally the window frame by extruding resin to the peripheral portion of a window panel, and FIG. 19 is an enlarged view of a molding die used for the method.

A window panel 43 was fixed to a driving apparatus 44, and a peripheral portion of the window panel 43 was fitted to a molding die 41. Then, the window panel 43 was moved by the driving apparatus 44 so that the peripheral portion of the window panel 43 was moved along the molding die 41 while a thermoplastic resin softened by heating was extruded through the die 41 to the peripheral portion of the window panel 43. Thus, a shaped product 50 for the window frame was formed in a predetermined shape at the peripheral portion of the window panel 43. Further, the shaped product 50 was cooled by heat dissipation or using a cooling means, whereby a window panel with a window frame in which the window panel and the window frame are formed in one piece could be obtained.

In FIG. 18, reference numeral 42 designates an apparatus for heating and softening the resin and for supplying the resin to the molding die 41.

Figure 20:
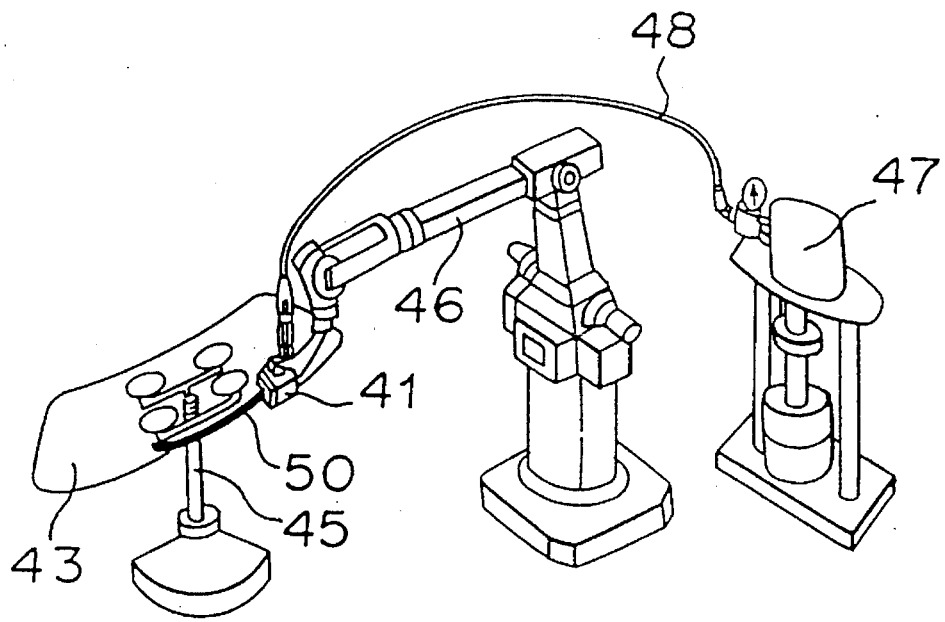
FIG. 20 is a schematic view showing an embodiment of the method of forming a window frame on a window panel in one piece according to the present invention.

FIG. 20 is a schematic view showing another example of a method of extruding resin to the peripheral portion of a window panel to form a one-piece structure of the window panel with a window frame.

The window panel 43 was fixed to a holding table 45 and a peripheral portion of the window panel 43 was fitted to the molding die 41. Then, the molding die 41 was moved along the direction of the peripheral portion of the window panel 43 while a thermoplastic resin heated and softened was extruded to the peripheral potion of the window panel 43. Thus, the shaped product 50 for a window frame was formed in a predetermined shape at the peripheral portion of the window panel 43.

Further, the shaped product 50 for a window frame was cured by heat dissipation or by using a predetermined cooling means whereby a window panel with a window frame wherein the window panel and the window frame are formed in one piece could be obtained.

In FIG. 20, reference numeral 46 is a driving apparatus for moving the molding die 41 along the direction of a peripheral portion of the window panel 43; numeral 47 designates an apparatus for heating and softening the resin and for supplying the resin to the molding die 41; and numeral 48 designates a heat-resistant flexible hose for connecting the molding die 41 to the apparatus 47 for supplying resin.

Figure 21:
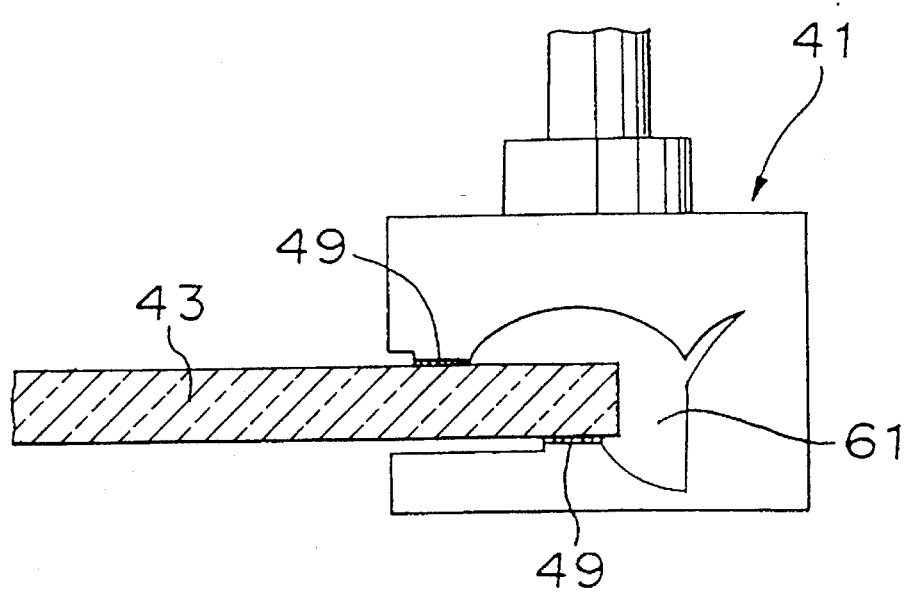
FIG. 21 is a plane view of the molding die shown in FIG. 20.
Figure 22:
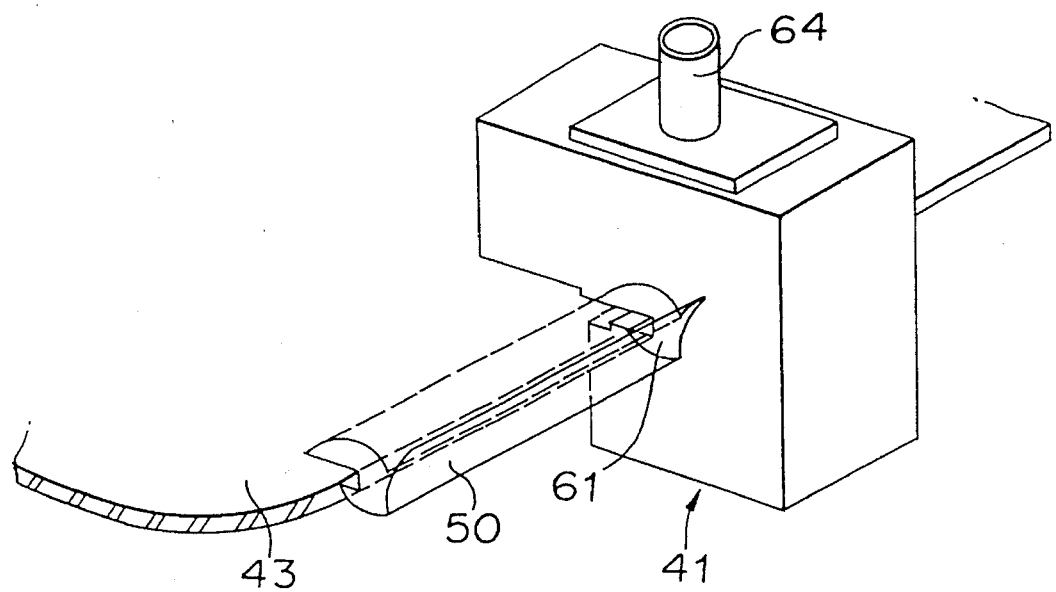
FIG. 22 is an enlarged view of a part of the die in FIG. 20.

FIGS. 21 and 22 are respectively a plane view and a perspective view showing the molding die shown in FIG. 20.

These Figures clearly show how the window panel 43 is fitted to the molding die 41.

The molding die 41 has no slide core inside of it and has an outlet opening of a constant shape in cross section. The shape of the outlet opening 61 of the molding die 41 is substantially the same as the shape of the window frame to be formed at the peripheral portion of the window panel 43, and accordingly, a shaped body having a constant cross-sectional shape can be produced.

The molding die 41 can be used by fitting the peripheral portion of the window panel 43 into the molding die 41. In this case, a resilient material 49 may be disposed at a portion for fitting the window panel 43 so that an error in the shape of the window panel, or an error in the movement of the molding die 41 or the window panel can be reduced or absorbed. The molding die 41 may be fixed whale the window panel 43 is moved, or the molding die 41 may be moved along the peripheral portion of the window panel 43. In the movement of the window panel 43 or the molding die 41, synthetic resin is extruded through the molding die 41, whereby the shaped product 50 for a window frame having a constant shape in cross section can be formed at the peripheral portion of the window panel.

In any case of using the molding dies A through F, a window frame in which the cross-sectional shape is continuously changed can be formed.

Figure 24:
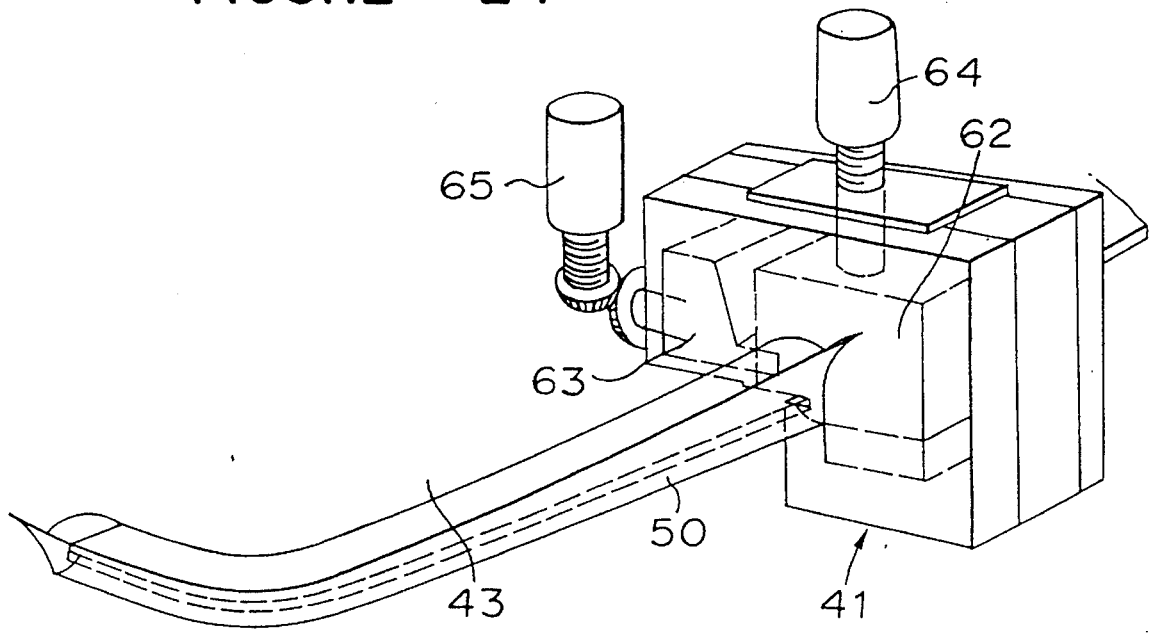
FIG. 24 is an enlarged view showing a case of using a molding die including an slide core in FIG. 20.
Figure 23:
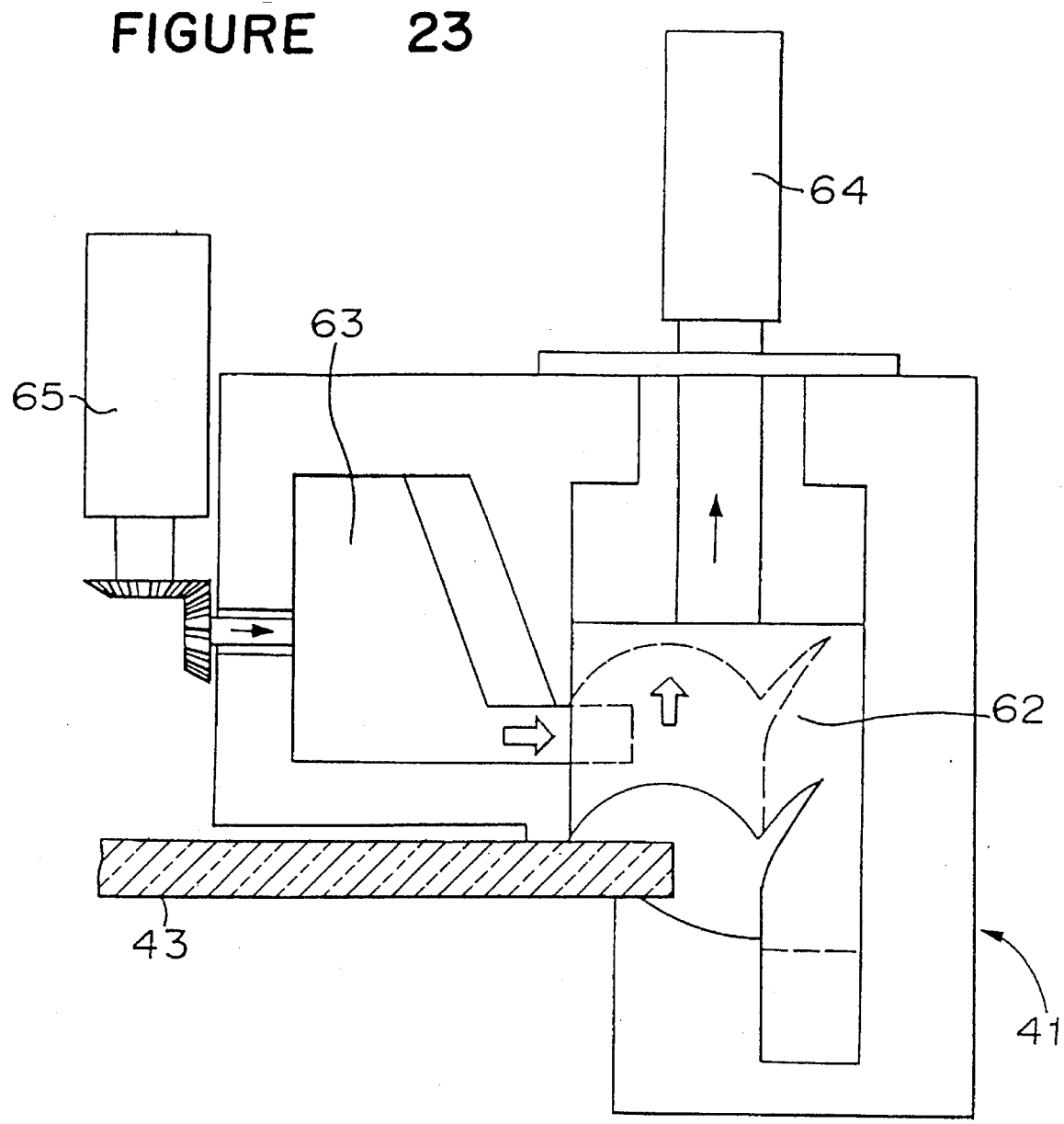
FIG. 23 is a plane view of the molding die shown in FIG. 20.

FIG. 23 is a plane view and FIG. 24 is a perspective view, i.e. an enlarged view of FIG. 20 showing another embodiment of molding die used for the present invention. Slide cures 62 and 63 are received inside a molding die 41. The shape of a window frame to be produced is changed by advancing or retracting the slide cores 62, 63. For instance, a shaped product in which the cross-sectional shape is continuously changed can be formed by advancing and retracting the slide cores by means of electric motors 64 and 65 and by associating the advancing and retracting movement of the slide cores with the movement of the molding die or a window panel. For instance, the advancing and retracting movements of the slide cores 62 and 63 are controlled as follows. A speed of shaping (i.e. a moving speed of the window panel or the molding die) and points at which the cross-sectional shape of the window frame is changed are previously determined, and the data are inputted to an appropriate means. Further, a timer or timers for starting the advancing or retracting movement of the slide cores on the basis of the input data are set. Thus, the slide cores 62 and 63 can be advanced or retracted with a predetermined movement according to a given moving speed and points of a change in the cross-sectional shape of the window frame after a predetermined time has passed from the initiation of the movement.

Further, it is preferable to control an amount of resin to be extruded in response to a moving speed of the die or the window panel. As a result, accuracy in the width or height of the shaped body can be increased, and a fault of appearance such as a wavy portion or a knot-like portion in the surface of the window frame can be reduced.

For instance, a moving speed of the die or the window panel is processed to obtain an analogue output and an amount of resin to be discharged is automatically controlled by using the output signal. Thus, by associating various devices which detect the moving speed and the discharging amount, a fault of the appearance of the shaped product can be eliminated.

There is another example of controlling the discharging amount. The discharging amount is adjusted in association with the controlled movement of the slide cores by means of the timers as described before. With such measures, the cross-sectional area of the window frame can be made to correspond to the discharging amount of the resin. Then, the discharging amount of the resin suitable for the cross-sectional shape which is gradually changed, can be obtained. For instance, when the cross-sectional area of the window frame is doubled, the discharging amount of the resin is also doubled in a proportional relation. Further, it is preferable that the discharging rate of resin at the outer peripheral portion of the window frame is larger than the discharging amount at the inner peripheral portion of the window frame at the corner portion of the window panel.

For instance, a desired control of the discharging quantity can be obtained by using a gear pump having an excellent quantity determination in a discharging system. Further, in order to keep a predetermined amount of the resin to be discharged through the molding die, the most reliable method is that the discharging quantity is measured, processed and self-controlled. As an alternative method, the discharging quantity of the resin is taken as a function of a resin pressure passing through the die, and a pressure sensor is utilized, whereby the pressure is controlled to have a predetermined value, and the discharging quantity can be controlled stably.

The movement of the molding die or the window panel is preferably done by using a driving device such as a multi-axial type robot. As the multiaxial type robot, a six-axial robot is in particular preferable. When data on the shape, the dimensions and the locus of movement of the window panel are previously inputted into the multiaxial type robot, the molding die or the window panel fixed to the multiaxial robot can be correctly moved. Thus, a shaped body for the window frame can be formed at a predetermined position of the window panel.

In many cases, a window panel, in particular, a window glass for a vehicle has a three-dimensional curved shape by bending the window glass to have predetermined radius of curvature. In such case, there are sometimes an error in dimension and inaccuracy in bending. When the window panel has such an error, a means for correcting the error may be provided to correct the previously inputted data of locus, in addition to the measures of absorbing the error by means of resilient material as described before.

For instance, a sensor is deposed at an end of the molding die to detect a relative position or a relative angle between the window panel and the molding die whereby an error in locus or the like can be adjusted. Further, the above-mentioned error can be absorbed or reduced by providing a spring or a cushion member using a gas pressure at the top end of the robot or a holing portion of a holding table. In this case, a guide may be provided at the die or the window panel so that a force of the guide is reduced by the cushion member, and the molding die or the window panel is moved along the guide to thereby absorb or reduce the error.

The thickness of each of the elide cores (the length of the shaping space) should be 6 mm or more in order to obtain a sufficient shaping effect to the resin in the shaping space. On the other hand, when the resin is extruded directly through the molding die on the window panel to obtain a one-piece body of the window frame and the window panel, the thickness of the slide cores should be 40 mm or less. When the thickness of the slide cores is larger than 40 mm, a gap will result between the window panel and the molding die when the molding die reaches a corner portion of the window panel during the relative movement of the window panel to the molding die. Further, when the radius of curvature of the corner portion is large, the thickness of the slide cores should be about 15 mm. Accordingly, there is an upper limit in the thickness of the dies depending on the shape of the window panel and a condition of extruding the resin, e.g., the resin being directly extruded on the window panel.

The number and the shape of the slide cores are determined depending on the size and the shape of a window frame to be shaped and a degree of change of the window frame. In particular, a smooth movement of the slide cores in the molding die can be obtained by forming the slide cores to have a tapered contacting portion in cross section so as to be slidable at the contacting surfaces.

As the resin used for the present invention, resin of a thermosetting type or a moisture hardening type may be used other than the thermoplastic resin described in the above-mentioned example. However, the thermosetting type resin requires a heating process after the shaping of the molding. The moisture hardening type resin requires a curing step for a long time after the shaping. On the other hand, in the thermoplastic resin, the resin is solidified by heat dissipation by merely leaving it after the shaping of the window frame. Accordingly, an additional step after the shaping can be eliminated. In other words, a risk of deforming of the shaped product in an unstable condition before the curing can be eliminated. Therefore, the thermoplastic resin is most preferable as material for the window frame in the present invention. Such material is sufficient to use as far as it is in a softened state by heat at the time of extruding for shaping and it is cured by heat dissipation or by using a suitable cooling means. For such material, there are a polyvinyl chloride type resin, an olefin type elastomer, a styrene type elastomer or the like.

Temperature for the thermoplastic resin to be extruded through the die should be such one at which the resin is sufficiently softened to be extruded through the die, and can be to the extent that the shape of a shaped product extruded is maintained. Specifically, a temperature range of about 150° C.–300° C. is preferable to be employed. For instance, when the polyvinyl chloride is used, the temperature of the resin is preferably in a range about 150° C.–200° C. When an olefin type or a styrene type rein is used, the temperature of the resin is preferably in a range of about 200° C.–300° C. When the temperature is lower than the above-mentioned range, the outer appearance of the window frame after curing is not satisfactory. On the other hand, when the temperature is higher, the shape of the window frame after the shaping by extrusion can not be sufficiently maintained.

Further, the resin should maintain a predetermined shape at the peripheral portion of the window panel until it is cured after the extrusion. Accordingly, it should have a viscosity of 100 poises–500,000 poises after the conditions of the above-mentioned temperature range and a shearing speed of 10/sec. When the viscosity is less than the above-mentioned value, the resin can not be formed to have a predetermined shape or the resin can not maintain a predetermined shape until it is cured after the shaping. Further, when the viscosity is higher than the above-mentioned value, the pressure of the resin to be extruded becomes excessive.

In a case of moving the molding die along the peripheral portion of the window panel, it is necessary to use a hose for feeding the resin from a device for supplying resin to the molding die. When the thermoplastic resin is used as material for the molding, the hose should have a heat resistance property in order to feed the resin softened by heat. Further, since the hose is moved along the peripheral portion of the window panel along with the molding die, the hose is sometimes required to have an ability of turning 360° during the movement along the entire peripheral portion of the window panel. A six-axial robot is preferably used as a die-driving device An order to smoothly move the die along with the hose. The six-axial robot should have a specific off-set axial structure wherein the final sixth axis is arranged at the outside of the own arm. Specifically, an off-setting arm is provided at the top end of the arm of the final sixth axis so that the off-setting arm is rotatable freely around the arm of the sixth axis. The second rotating axis is provided at a position off-set from the rotating axis or the off-setting arm, and the hose is disposed to be turned around the second rotating axis. Thus, the hose is prevented from becoming entangled in the arms of the robot when it is moved around the peripheral portion of the window panel.

Further, a rotary joint may be connected between the molding die and the hose. In this case, it is possible to move the molding die connected with a relatively rigid hose at an optional position in a free posture.

As the window panel, an ordinary used single inorganic glass plate, a strengthened glass plate, a laminated glass, a transparent plastic plate such as polycarbonate, acryl or the like with or without applying a functioning film on a surface of it may be used. Further, the resin can be extruded on the peripheral portion of the window panel even when the peripheral portion is applied with a coating for sealing called black ceramic coating. Further, in order to improve the bonding strength of the window frame to the window panel, primer or an adhesive agent may be applied on the window panel surface.

The window frame to be shaped by the method of the present invention con be formed integrally with the both sides of the window panel by fitting the peripheral portion of the window panel to the molding die as described before. The window frame may be formed on a surface of the window panel, or may be formed on the surface as well as a side edge portion of the window panel. In this case, the molding die should be arranged facing the surface on which the window frame is formed, but not be arranged at the peripheral portion of the window panel by fitting. Thus, the window frame having a predetermined shape can be formed.

The window frame may be formed in the entire peripheral portion or a part of the peripheral portion of the window panel. For instance, when applied to a front glass for a vehicle, the window frame may be formed on three sides except for the lower portion of the window panel. When the present invention is applied to a rear glass of a vehicle, the window frame is formed on the entire peripheral portion of the window panel. Thus, the position and the shape of the window frame are determined depending on usage.

EXAMPLE 1

Figure 27:
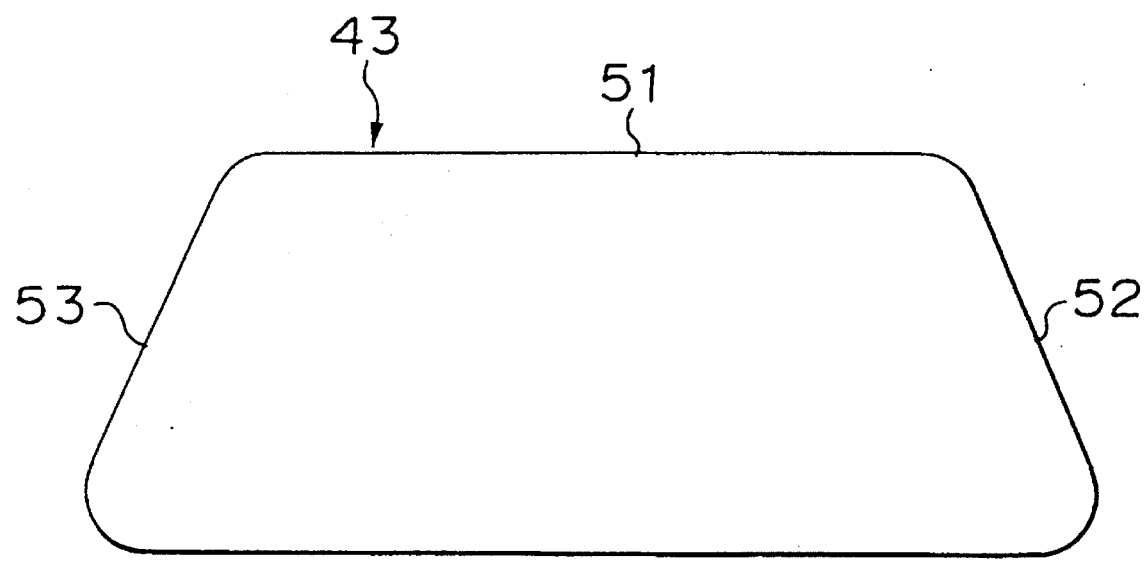
FIG. 27 is a front view showing an embodiment of the window panel.
Figure 25:
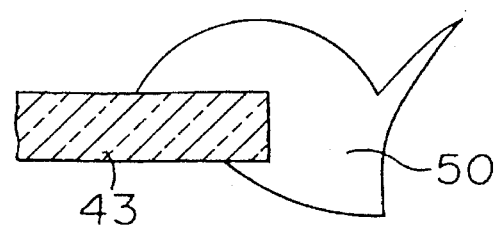
FIGS. 25 and 26a, 26b and 26c are cross-sectional views showing an embodiment of a window panel with a window frame according to the present invention.

"Bond master" (tradename: made by Kanebo NCS K.K.) was applied as a bonding agent to a peripheral portion of a window panel having a shape shown in FIG. 27 and a thickness of 3.5 mm. The window panel was fixed to a driving device 4 by means of sucking disks. The peripheral portion of the window panel was fitted to a die 1 having a shape as shown in FIG. 21. The peripheral portion of the window panel was moved along with the die 1 at a speed of 1 m/min according to the method as shown in FIG. 18. During the movement, polyvinyl chloride resin softened 25,000 poises under the condition of a shear of $\frac{1}{10}$ sec. at 180° C. was extruded to obtain the window panel with a shaped product 20 of polyvinyl chloride at a peripheral portion, wherein the shaped product 20 had a cross-sectional shape shown in FIG. 25.

Then, the window panel with a shaped product was left for heat dissipation to thereby obtain the window panel attached integrally a window frame of polyvinyl chloride. The final product had a strong bonding strength between the window panel and the window frame, and the outer appearance was excellent.

EXAMPLE 2

Figure 26A:
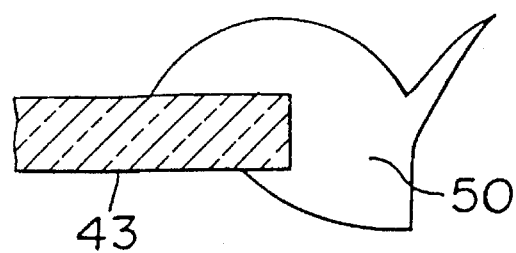
Figure 26B:
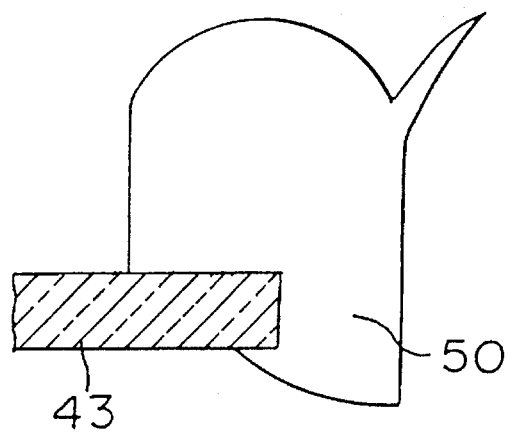
Figure 26C:
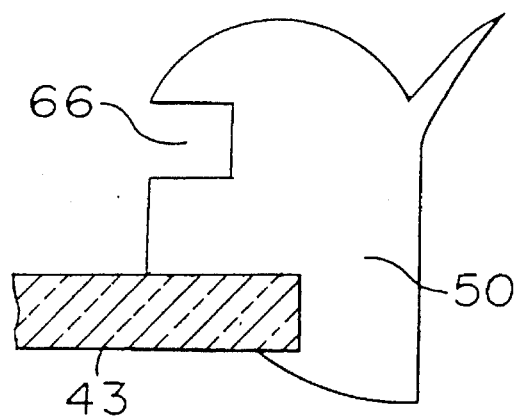

"Bond master" (tradename: manufactured by Kanebo NCS K.K.) was applied as a bonding agent to a peripheral portion of a window panel having a shape shown in FIG. 27 and a thickness of 3.5 mm. The window panel was fixed to the driving device 4 by means of sucking disks. Then, the peripheral portion of the window panel was fitted to a die 1 having a shape shown in FIG. 24. The peripheral portion of the window panel was moved along the die 1 at a moving speed of 1 m/min according to the method shown in FIG. 18. During the movement, polyvinyl chloride resin softened 30,000 poises under the condition of a shear of $\frac{1}{10}$ sec. at 180° C. was extruded onto the upper portion 51 of the window panel to thereby form a shaped product of polyvinyl chloride having a shape in cross section shown in FIG. 26a at the upper portion 51. Then, slide core received inside the die 1 was raised upwardly by an electric motor so that a shaped product 50 of polyvinyl chloride having a shape in cross section shown in FIG. 26b was formed at the upper part of a side portions 52, 53 of the window panel so as to continue from the upper portion 51. Then, the slide core received inside the die was moved forwardly by an electric motor so that the shaped product 50 of polyvinyl chloride having a shape in cross section shown in FIG. 26c was formed at the lower part of the side portions 52, 53 of the window panel so as to continue from the upper portion 53. Thus, there was obtainable the window panel having a shaped product of the polyvinyl chloride in which the cross-sectional shape of the shaped product is continuously changed in the order of the shapes shown in FIGS. 26a, 26b and 26c, and a rain gutter 66 is formed at both sides of the window panel.

The window panel with a shaped product was left for heat dissipation to thereby obtain the window panel attached integrally with a window frame of polyvinyl chloride. The final product had a strong bonding strength to the window frame, and the outer appearance was excellent.

In accordance with the present invention, the problems of the outer appearance and an insufficient strength, which were resulted from the fact that a window frame attached to the peripheral portion of a front glass or a rear glass for a vehicle was formed by joining separate parts, can be eliminated. Further, the problems that the shaping of the window frame was not stable and the outer appearance of the window frame was not constant, which were resulted in the conventional technique that an obstacle such as a shutter was disposed in front of a die for a extruding the resin, the window frame was formed integrally with the front glass or the rear glass wherein the cross-sectional shape was continuously changed, can be minimized. According to the present invention, a window frame for a window panel in which the cross-sectional shape of the window frame is continuously changed can be formed.

According to the present invention, since resin can be extruded on a peripheral portion of a window panel, which is not only a flat window panel but also a three-dimensional curved shape, to form a window frame attached integrally with the window panel, a substantial reduction of the number of processes is possible. Further, in a complicated three-dimensional curved window panel, there is no risk of braking of the window panel even in a case that the window panel has inaccurate dimensions by bending. According to the present invention, a window panel with a window frame attached to a correct position from a edge of the window panel and having a good design is obtainable.

When a thermoplastic resin is used as material for a window frame, the material is cured by simply leaving a shaped product of window frame. Accordingly, an additional heating step after shaping is not required for a thermosetting material. Accordingly, any stress is not applied to the shaped product having an unstable shape before curing and a window frame having an excellent appearance can be obtained.

We claim:

1. A method of making by extrusion-molding an elongated window frame used for a window panel, using an extrusion-molding die wherein the die includes at least one slide core located therein for defining the cross-sectional shape of the window frame, and extruding resin from the die while moving the slide core in the extrusion-molding die so that the cross-sectional shape of the window frame is continuously changed, wherein a surface which contacts the resin of said at least one slide core has a dimension in a direction in which the resin passes which corresponds to a dimension of a surface of a shaping space of the die which contacts the resin in the direction in which the resin passes.

2. The method according to claim 1, wherein a rate of extrusion of resin is changed depending on a change of the cross-sectional shape of the window frame.

3. The method according to claim 1, wherein a driving source for moving the slide core is an electric motor, a fluid pressure or a spring.

4. The method according to claim 1, wherein the extrusion-molding die is adapted to extrude two or more different kinds of material at the same time while the shape in cross section of the window frame is changed.

5. A method of making a window panel with a window frame wherein a shaped product of resin is formed by extruding through a die resin onto at least a surface of a window panel along the peripheral portion of the window panel, and the shaped product is cured to thereby connect the window panel with the cured shaped product in one piece, wherein a thermoplastic resin is used as the resin; the thermoplastic resin is extruded in a softened state by heating it from the die so that the shaped product is formed on the peripheral portion of the window panel; and the thermoplastic resin is cured, wherein the die has a cross-section for extrusion which is substantially the same as the cross-section of the window frame.

6. The method according to claim 5, wherein the viscosity of the resin when the resin is extruded from the die in a softened state is in a range of 1000 poises– 500,000 poises under the condition of a shear rate of 1/10 sec.

7. The method according to claim 5, wherein the thermoplastic resin is a soft polyvinyl chloride resin, an olefin resin or a styrene resin.

8. The method according to claim 5, comprising a step of changing the shape of the portion of the die through which the resin is extruded, whereby the cross-sectional shape of the shaped product formed on the peripheral portion of the window panel is continuously changed.

9. The method according to claim 8, wherein the die is provided with at least one slide core inside it, and the slide core is moved during the extrusion of the resin to change the shape of the portion of the die through which the resin is extruded, whereby the cross-sectional shape of the shaped product formed on the peripheral portion of the window panel is continuously changed, and wherein a surface which contacts the resin of said at least one slide core has a dimension in a direction in which the resin passes which corresponds to a dimension of a shaping space of a surface of the die which contacts the resin in the direction in which the resin passes.

10. The method according to claim 8, wherein a rate of extrusion of the resin is continuously controlled depending on a change of the shape of the portion of the die through which the resin is extruded.

11. A method of making a window panel with a window frame wherein a shaped product of resin is formed by extruding through a die resin on at least a surface of a window panel along the peripheral portion of the window panel, wherein the die is provided with at least one slide core inside it, and the slide core is moved during the extrusion of the resin to change in shape a portion of the die through which the resin is extruded, whereby the cross-sectional shape of the shaped product formed on the peripheral portion of the window panel is continuously changed, and wherein a surface which contacts the resin of said at least one slide core has a dimension in a direction in which the resin passes which corresponds to a dimension of a shaping space of a surface of the die which contacts the resin in the direction in which the resin passes.

12. The method according to claim 11, wherein the viscosity of the resin when the resin is extruded from the die in a softened state is in a range of 1000 poises– 50,000 poises under the condition of a shear rate of 1/10 sec.

13. The method according to claim 11, wherein the resin is a thermoplastic polyvinyl chloride resin, a thermoplastic olefin resin or a thermoplastic styrene resin.

14. The method according to claim 11, wherein a rate of extrusion of the resin is continuously controlled depending on a change of the shape of the portion of the die through which the resin is extruded.

15. The method according to claim 1, wherein the dimension of the surface which contacts the resin of said at least one slide core in the direction in which the resin passes is substantially equal to the dimension of the shaping space of a surface of the die which contacts the resin in the direction in which the resin passes.

16. The method according to claim 9, wherein the dimension of the surface which contacts the resin of said at least one slide core in the direction in which the resin passes is substantially equal to the dimension of the shaping space of a surface of the die which contacts the resin in the direction in which the resin passes.

17. The method according to claim 11, wherein the dimension of the surface which contacts the resin of said at least one slide core in the direction in which the resin passes is substantially equal to the dimension of the shaping space of a surface of the die which contacts the resin in the direction in which the resin passes.

18. A method of making by extrusion-molding an elongated window frame used for a window panel, wherein the method comprises the steps of:

providing an extrusion-molding die wherein the die includes at least two slide cores located therein;

defining a shaping space, with the slide cores and a main body of the die, which has a cross-sectional shape which is substantially the same as the cross-sectional shape of the window frame; and extruding resin from the die while moving at least one of the slide cores in the extrusion-molding die so that the cross-sectional shape of the window frame is continuously changed.

19. The method according to claim 18, wherein each of the slide cores has a surface which contacts the resin, each of said surfaces of the slide cores having a dimension in the direction in which the resin passes which corresponds to the dimension of the shaping space of a surface of the die which contacts the resin in the direction in which the resin passes.

20. The method according to claim 19, wherein the dimension of each of said surfaces of the slide cores which contacts the resin is substantially equal to the dimension of the shaping space of a surface of the die which contacts the resin in the direction in which the resin passes.

21. The method according to claim 8, wherein the die is provided with at least two slide cores inside it, and the slide cores, a main body of the die, and the peripheral portion of the window panel define a shaping space which has a cross-sectional shape which is substantially the same as the cross-sectional shape of the window frame, and at least one of the slide cores is moved during the extrusion of the resin to change the shape of the portion of the die through which the resin is extruded, whereby the cross-sectional shape of the shaped product formed on the peripheral portion of the window panel is continuously changed.

22. The method according to claim 21, wherein each of the slide cores has a surface which contacts the resin, each of said surfaces of the slide cores having a dimension in the direction in which the resin passes which corresponds to the dimension of the shaping space of a surface of the die which contacts the resin in the direction in which the resin passes.

23. The method according to claim 22, wherein the dimension of each of said surfaces of the slide cores which contacts the resin is substantially equal to the dimension of the shaping space of a surface of the die which contacts the resin in the direction in which the resin passes.

24. A method of making a window panel with a window frame wherein a shaped product of resin is formed by extruding through a die resin on at least a surface of a window panel along a peripheral portion of the window panel, wherein the die is provided with at least two slide cores inside it, and the slide cores, a main body of the die, and the peripheral portion of the window panel define a shaping space which has a cross-sectional shape which is substantially the same as the cross-sectional shape of the window frame, and at least one of the slide cores is moved during the extrusion of the resin to change in shape a portion of the die through which the resin is extruded, whereby a cross-sectional shape of the shaped product formed on the peripheral portion of the window panel is continuously changed.

25. The method according to claim 24, wherein each of slide cores has a surface which contacts the resin, each of said surfaces of the slide cores having a dimension in the direction in which the resin passes corresponds to the dimension of the shaping space of a surface of the die which contacts the resin in the direction in which the resin passes.

26. The method according to claim 25, wherein the dimension of each of said surfaces of the slide cores which contacts the resin is substantially equal to the dimension of the shaping space of a surface of the die which contacts the resin in the direction in which the resin passes.

* * * * *